R. & A. M. STOCK.
HANDLE FOR BUNGS, &c.
APPLICATION FILED APR. 3, 1909.
975,174.
Patented Nov. 8, 1910.
2 SHEETS—SHEET 1.
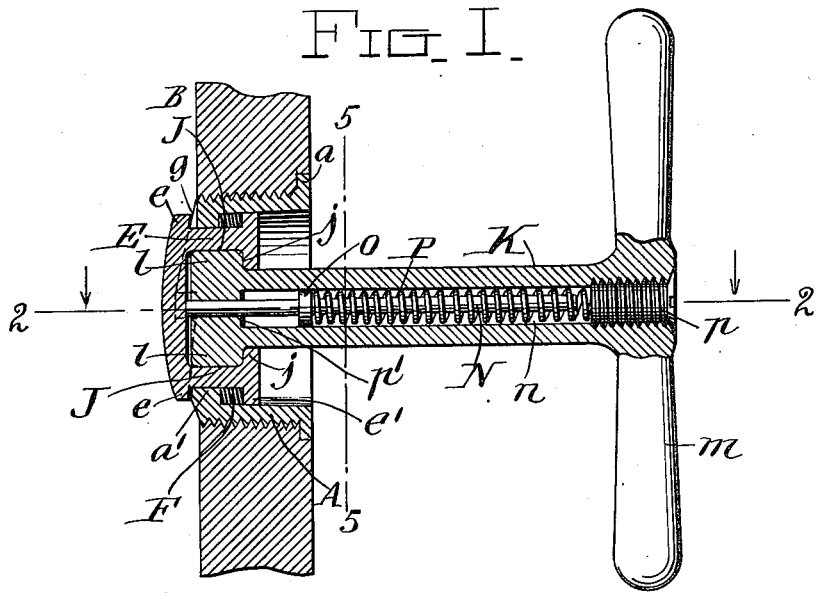
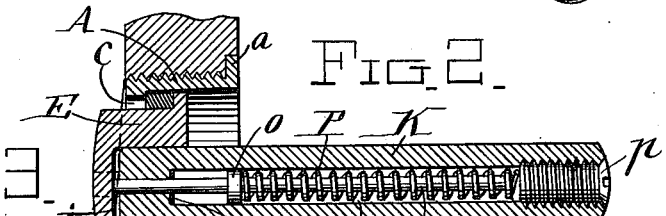
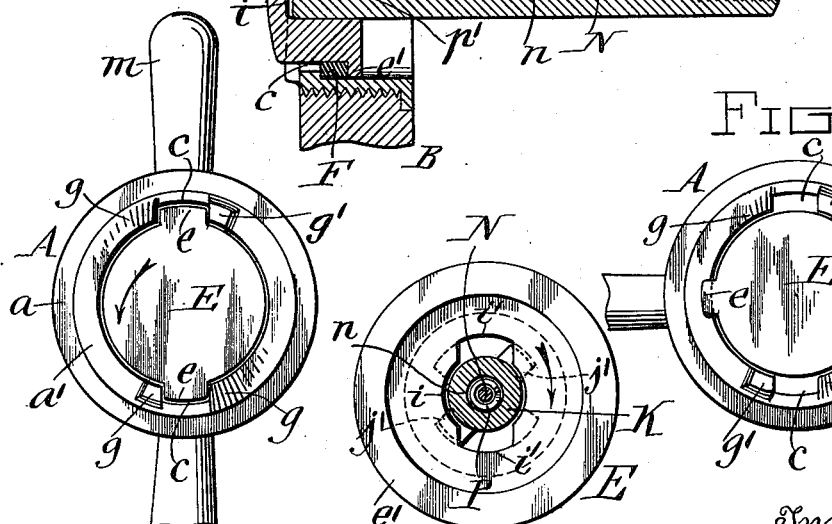
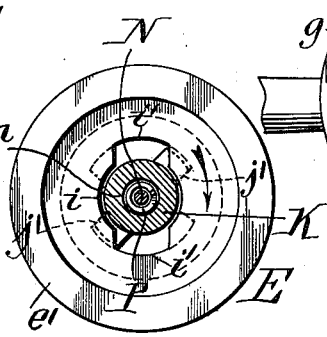
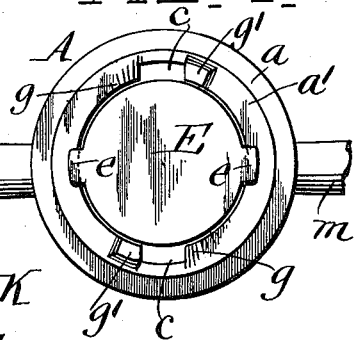
Witnesses:
J. Milton Jester
Richard Sommer
Inventors
Robert Stock
Augusta M. Stock
by Geyer & Popp
Attorneys.

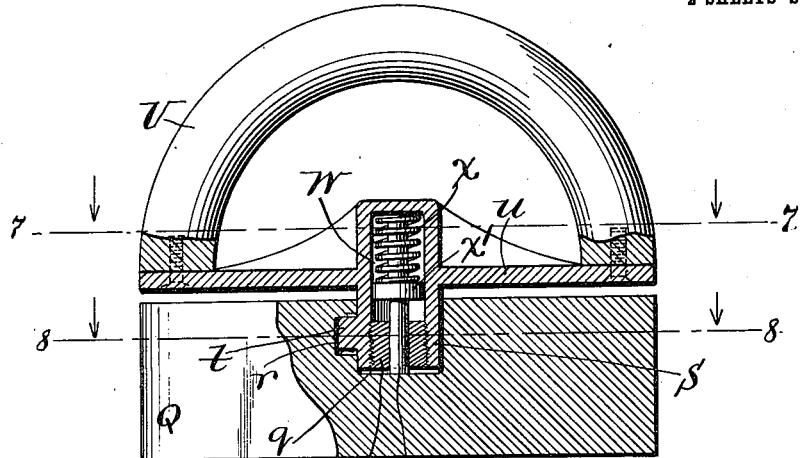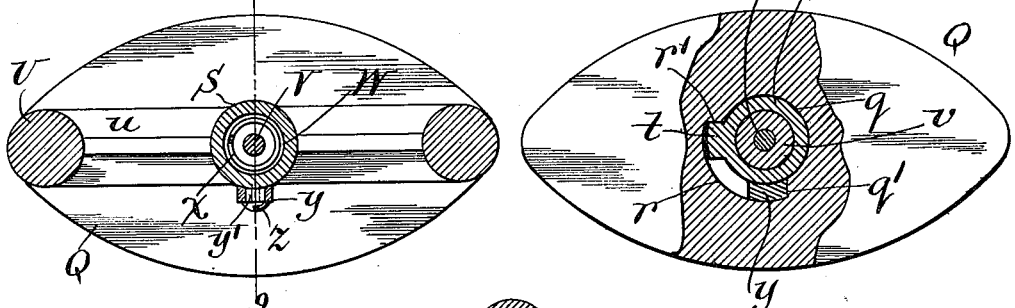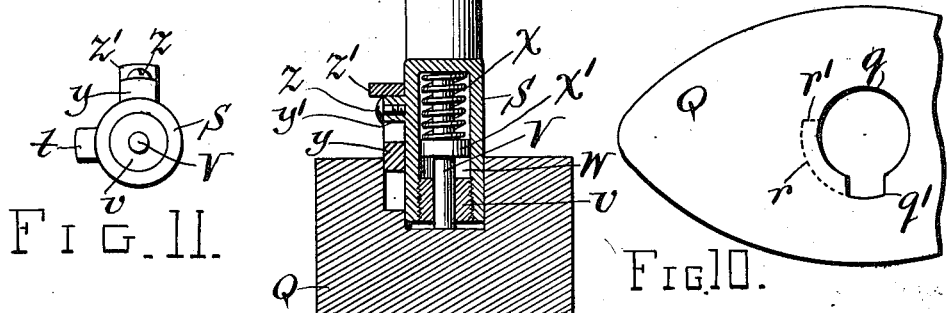

UNITED STATES PATENT OFFICE.

ROBERT STOCK AND AUGUSTA M. STOCK, OF BUFFALO, NEW YORK, ASSIGNORS TO ROBERT STOCK MANUFACTURING CO., OF BUFFALO, NEW YORK, A CORPORATION OF NEW YORK.

HANDLE FOR BUNGS, &c.

975,174.  Specification of Letters Patent.  Patented Nov. 8, 1910.

Application filed April 3, 1909. Serial No. 487,803.

*To all whom it may concern:*

Be it known that we, ROBERT STOCK and AUGUSTA M. STOCK, citizens of the United States, and residents of Buffalo, in the county of Erie and State of New York, have invented a new and useful Improvement in Handles for Bungs, &c., of which the following is a specification.

This invention relates to an improved handle or key for manipulating the bungs of beer barrel bushings, sad or flat irons and other articles.

The handles or keys for operating the bungs of beer barrel bushings having heretofore usually been so constructed that upon withdrawing the handle or key from the bung after the latter has been tightened in the bushing, the bung would often be loosened owing to the excessive friction between the handle and the bung which is produced by the wedge action of the coöperating surfaces of the handle and bung. Such partial loosening of the bung is objectionable for the reason that it results in leakage.

In practice it is desirable to retain the handle and bung in a connected or interlocked condition inasmuch as the introduction and removal of the bung can by this means be effected by one hand without the liability of the bung dropping from the handle leaving the other hand of the operator free for other work. Similar conditions are present in the manipulation of a sad iron which has a removable handle.

It is the object of this invention to provide a handle for an article which is to be manipulated by a handle which permits of reliability and securely connecting the handle and said article while manipulating the same but which permits of easily detaching the handle from said article when this is required.

In the accompanying drawings consisting of 2 sheets:—Figure 1 is a longitudinal section showing our invention applied to the handle or key for applying a beer barrel bung to or removing the same from its bushing. Fig. 2 is a longitudinal section taken at right angles to Fig. 1, on line 2—2, of said figure. Fig. 3 is a face view of the bushing and bung from the inner end thereof showing the position of the bung relatively to the bushing when the same is passed into and out of the bushing. Fig. 4 is a similar view showing the position of the bushing and bung when these parts are interlocked. Fig. 5 is a cross section in line 5—5, Fig. 1. Fig. 6 is a fragmentary vertical section showing our invention applied to a sad iron having a detachable handle. Figs. 7 and 8 are horizontal sections in the correspondingly numbered lines in Fig. 6. Fig. 9 is a vertical transverse section in line 9—9, Fig. 7. Fig. 10 is a fragmentary top plan view of the shoe or body of the sad iron with the handle thereof detached. Fig. 11 is an end view of the handle of the sad iron detached from its body.

Similar letters of reference indicate corresponding parts throughout the several views.

Referring to Figs. 1-5, A represents a hollow circular bushing which is screwed by means of a thread on its periphery into an opening in the barrel B and which is provided at its outer end with an external flange $a$ bearing against the outer side of the barrel and at its inner end with an internal annular flange $a^1$. On diametrically opposite sides the internal flange of the bushing is provided with notches $c$, $c$ extending from the bore of this flange part way toward the bore of the bushing. E represents a circular bung adapted to coöperate with the bushing and provided on diametrically opposite sides of its inner end with laterally projecting locking lugs $e$, $e$ and at its outer end with an annular flange $e^1$. F represents a washer or packing ring of rubber or other elastic material arranged on the periphery of the bung and bearing against the inner side of its external flange. In applying this bung to the bushing the same is passed inwardly through the bushing while its lugs $e$ are in line with the notches of the bushing, so that the lugs pass through the notches $c$ until said lugs are arranged beyond the inner side of the bushing and the packing ring F bears with its inner side against the outer side of the internal flange $a^1$ of the bushing. After the bung has been thus introduced into the bushing the same is turned in the direction of the arrow, Fig. 3, whereby the lugs of the bung are caused to rise up on inclined faces $g$ formed on the inner end of the bushing and thereby move the bung inwardly and compress the packing ring between the flanges $a^1$, $e^1$ of the bung and bushing for forming a tight closure between these parts. The bung is prevented from being turned in the wrong direction after being passed inwardly through the bushing by means of a pair of stop lugs $g^1$ which are arranged on those sides of the notches opposite the inclines.

Our improved handle or key for holding the bung while introducing or removing the same from the bushing and while tightening or loosening the same in the bushing and those parts of the bung which are adapted to receive this handle or key are constructed as follows:—Centrally on its outer side the bung is provided with a key seat or socket composed of a comparatively large central cylindrical part $i$ and two narrow side parts $i^1$ radiating from opposite sides of the central part $i$. On opposite sides of each narrow part of the key seat, the bung is provided with undercut locking recesses J forming inwardly facing shoulders $j$ on the outer sides of said recess and abutments $j^1$ at the back thereof, as shown in Figs. 1 and 5.

K represents the shank or body of the bung operating and holding handle or key which is preferably of cylindrical form and provided on opposite sides of its inner or front end with laterally projecting wings or lugs $l, l$ while its outer or rear end is provided with a transverse finger piece $m$. Upon placing the key with its shank in line with the central part of the socket and its wings in line with the central part thereof and then moving the key forward the shank and wings will pass into the socket. Upon now turning the key in the direction of the arrow, Fig. 5, its wings will be carried into the respective undercut recesses and engage with the backs $j^1$ thereof, thereby causing the bung to be turned and its lugs $e, e$ interlocked with the inclines $g$ of the bung. For detaching the bung the key is turned in the opposite direction, so that its wings enter the opposite recess of the socket and engage with the backs of the same.

The thickness of the wings lengthwise of the axis of the key is less than the depth of the socket of the bung, so that the wings do not bind in the recesses of the socket upon turning the key in the socket either when tightening or loosening the bung, thereby preventing the wings from becoming pinched or wedged so tightly in the socket as would otherwise cause possible loosening of the bung upon retracting the key after the bung is closed and also prevent easy detachment of the key from the bung.

In order to permit the wings of the key to thus loosely engage the recesses of the socket and still permit of reliably holding the bung on the key so that these parts will remain assembled and permit of manipulation thereof by one hand, a yielding pressure or gripping device is provided which preferably consists of a pressure rod N slidable lengthwise in a pocket $n$ in the shank of the key and adapted to engage at its front or inner end with the bottom of the socket in the bung, and a spring P surrounding the pressure rod with said pocket and bearing at its front end against a collar $o$ on the pressure rod while its outer end bears against a screw plug $p$ which closes the outer or rear end of the pocket in the shank. The forward movement of the pressure rod in the shank is limited by an internal shoulder $p^1$ in the pocket of the shank which faces outwardly and which is adapted to be engaged by the collar of the pressure rod.

Upon inserting the key or handle into the socket of the bung the pressure rod by engaging with the bottom of this socket is retracted within the shank of the key and increases the strain or tension on the spring P, so that upon turning the key and engaging its wings with a pair of the locking recesses, these wings will be held frictionally by spring pressure at their rear ends against the outer or rear sides $j$ of the recesses. This pressure is sufficiently great to hold the bung reliably on the key, so that it will not drop off during the ordinary handling of the same by the operator in applying the bung to or removing the same from the bushing and also to permit of easily connecting and disconnecting the key and bung. This pressure is also sufficiently light to permit the key to be turned backwardly after the bung has been tightened in the bushing without causing the latter to turn backwardly with the key, thereby avoiding loosening of the bung and consequent leakage.

An adaptation of our invention to a sad or flat iron is shown in Figs. 6–11, in which the means for connecting and disconnecting the handle and the body of the flat iron are constructed as follows:—Centrally on the upper side of the flat iron body Q the same is provided with a socket having a comparatively large cylindrical main part $q$ and a narrow side part $q^1$ extending laterally from the main part and an undercut locking recess $r$ on one side of the narrow part of the socket forming a downwardly facing shoulder $r^1$ on the upper side of said recess. S represents a hollow vertical shank of cylindrical form adapted to enter the main part of the socket and provided on one side of its lower end with a laterally projecting locking wing $t$. At its outer end the shank is provided with a cross bar $u$ to which the finger piece U of the handle is connected. V represents a vertical pressure rod slidable lengthwise in the shank and guided at its lower end in a screw plug $v$ which closes the lower end of the pocket W in the shank. $x$ represents a spring surrounding the pressure rod within the pocket and bearing at its lower end against a collar $x^1$, on the pressure rod while its upper end bears against the top of the socket in the shank. The downward movement of the pressure rod under the action of its spring is limited by the collar $x^1$ engaging the screw plug $v$. Upon inserting the shank in the socket while its wing is in line with the narrow part of the socket and then turning the shank so that the wing enters the undercut recess, the pressure rod will be retracted and increase the tension on the spring $x$, whereby the wing of the shank will be held yieldingly in engagement with the upper side of the undercut recess of the socket. In order to guard against accidental backward rotation of a shank in the socket of the flat iron while the same is in use, a locking device is provided which preferably consists of a vertically sliding locking bolt $y$ which is retained on a guide lug $y^1$ on the side of the shank S by means of a screw $z$ and is provided with a finger piece $z^1$. This locking bolt is arranged on the shank S on one side of its wing so that after this shank has been inserted into the socket of the flat iron and turned into its coupled position, the locking bolt will be in line with the narrow part of the socket, thereby permitting the locking bolt to be depressed into the narrow part of the socket and prevent backward rotation of the shank in the socket of the flat iron body.

We claim as our invention:

1. The combination of a movable body provided with an undercut socket, a handle having a shank provided with a laterally projecting wing adapted to engage with the undercut surface of said socket, and a yielding pressure device mounted on the handle and adapted to be strained upon inserting said handle into said socket, said pressure device comprising a rod separate from said handle and movable lengthwise on said shank and adapted to press its front end forwardly against the bottom of said socket, and a spring mounted on said handle and operating to hold said rod yieldingly in its projected position.

2. The combination of a movable body provided with an undercut socket, a handle having a shank provided with a pocket and a laterally projecting wing adapted to engage with the undercut surface of said socket, and a yielding pressure device mounted on the shank and adapted to be strained upon inserting said shank into said socket, said pressure device comprising a rod separate from said handle and movable lengthwise in the pocket in the shank of said handle and adapted to press forwardly at its front end against the bottom of said socket, and a spring arranged within the shank and adapted to hold the rod yieldingly in its forward position.

3. The combination of a movable body having an undercut socket, a handle having a shank provided with a pocket and a laterally projecting wing adapted to engage with the undercut surface of said socket and an internal undercut shoulder at the front end of the pocket, and a yielding pressure device mounted on the shank and adapted to be strained upon inserting said shank into said socket, said pressure device comprising a rod guided in a pocket in said shank and adapted to press forwardly at its front end against the bottom of said socket and having a collar within said pocket which is adapted to engage with said internal shoulder, a spring surrounding said rod and bearing at its front end against said collar, and a screw plug arranged at the rear end of said pocket and engaging with the rear end of said spring.

Witness our hands this 29th day of March, 1909.

ROBERT STOCK.
AUGUSTA M. STOCK.

Witnesses:
 THEO. L. POPP,
 E. M. GRAHAM.